(12) United States Patent
Yamazaki et al.

(10) Patent No.: US 6,487,874 B2
(45) Date of Patent: Dec. 3, 2002

(54) ABSORPTION REFRIGERATOR

(75) Inventors: Shiguma Yamazaki, Tochigi-ken (JP);
Eiichi Enomoto, Tochigi-ken (JP);
Yasushi Kamada, Tochigi-ken (JP);
Masahiro Furukawa, Tochigi-ken (JP)

(73) Assignees: Sanyo Electric Co., Ltd., Osaka-Fu (JP); Sanyo Electric Air Conditioning Co., Ltd, Tochigi-ken (JP)

( * ) Notice: Subject to any disclaimer, the term of this patent is extended or adjusted under 35 U.S.C. 154(b) by 0 days.

(21) Appl. No.: 10/045,608

(22) Filed: Nov. 7, 2001

(65) Prior Publication Data
US 2002/0112503 A1 Aug. 22, 2002

(30) Foreign Application Priority Data
Nov. 8, 2000 (JP) .......................................... 2000-340669

(51) Int. Cl.$^7$ ................................................. F25B 15/00
(52) U.S. Cl. ............................. 62/476; 62/238; 62/475; 62/85
(58) Field of Search ........................ 62/476, 238, 475, 62/85

(56) References Cited

U.S. PATENT DOCUMENTS

| | | | | |
|---|---|---|---|---|
| 4,055,963 A | * | 11/1977 | Shoji et al. | 62/238 |
| 5,259,202 A | * | 11/1993 | Nishiguchi et al. | 62/147 |
| 5,862,679 A | * | 1/1999 | Nakamura et al. | 62/497 |
| 5,901,567 A | * | 5/1999 | Suzuki et al. | 62/324.2 |
| 5,927,086 A | * | 7/1999 | Suzuki et al. | 62/141 |
| 5,956,969 A | * | 9/1999 | Furukawa et al. | 62/475 |
| 6,145,338 A | * | 11/2000 | Nakamura et al. | 62/497 |

* cited by examiner

Primary Examiner—William C. Doerrler
Assistant Examiner—Mark Shulman
(74) Attorney, Agent, or Firm—Weingarten, Schurgin, Gagnebin & Lebovici LLP

(57) ABSTRACT

An absorption refrigerator of excellent thermal efficiency where water vapor contained in the exhaust gas does not condenses even at the starting or during the partial load operation where the temperature elevation is small. A refrigerant drain heat collector 11 allowing the refrigerant liquid condensing by heating the intermediate absorption liquid in the low temperature regenerator 3 and flowing into the condenser 4 to exchange heat with a part of dilute absorption liquid and first and second heat collectors 26, 27 where the exhaust gas discharged from the gas burner 2 and the dilute absorption liquid exchange heat are installed and, at the same time, a absorption liquid pipe (absorption liquid branch pipe) 14 is installed, and a flow control valve 28 is installed in the absorption liquid pipe 14 and, furthermore, a controller 30 is installed in order to control the aperture of the flow control valve 28 so that a temperature sensor 29 continues to detect a predetermined temperature (for instance 100° C.) higher that the dew point temperature of the exhaust gas.

2 Claims, 2 Drawing Sheets

ABSORPTION REFRIGERATOR

BACKGROUND OF THE INVENTION

1. Field of the Invention

The present invention concerns an absorption refrigerator.

2. Detailed Description of the Prior Art

As shown in FIG. 2, an absorption refrigerator devised to reduce the fuel consumption by sending exhaust gas exhausted from a gas burner 2 for heating and boiling the dilute absorption liquid from a high temperature regenerator 1 to a first exhaust gas heat collector 26 installed between a high temperature heat exchanger 10 of an absorption liquid pipe 12 and the high temperature regenerator 1 and to a second exhaust gas heat collector 27 installed between a low temperature heat exchanger 9 and the high temperature heat exchanger 10, by elevating the temperature of a dilute absorption liquid transferred from an absorber 7 to the high temperature regenerator 1, and by reducing the heat quantity required by the gas burner 2, is well-known.

According to the aforementioned configuration, since the dilute absorption liquid of about 40° C. discharged from the absorber 7 is heated respectively by the low temperature heat exchanger 9/ the second exhaust gas heat collector 27/ the high temperature heat exchanger 10/ the first exhaust gas heat exchanger 26, elevates to around 135° C. and flows into the high temperature regenerator 1, fuel consumption of the gas burner 2 can be economized. Note that the temperature of the exhaust gas that has exchanged heat with the dilute absorption liquid in the first and second exhaust gas heat exchangers 26, 27 lowers to the order of 100° C.

SUMMARY OF THE INVENTION

In the aforementioned absorption refrigerator of the prior art, as the temperature of the exhaust gas that has exchanged heat with the dilute absorption liquid in the first and second exhaust gas heat exchangers has lowered to around 100° C., there are problems that, if it is intended to further increase heat collection from the exhaust gas in order to reduce furthermore the fuel consumption of the gas burner or others of the high temperature regenerator, water vapor in the exhaust gas condenses to accelerate corrosion of metal piping portions, and so on, requiring to plan a further reduction of the fuel consumption using another methods at the same time, and constituting a problem to be resolved.

In order to solve problems of the aforementioned prior art, the present invention provides an absorption refrigerator of a first configuration comprising a high temperature regenerator for evaporating and separating a refrigerant by heating and boiling by a burner, for obtaining a vapor and an intermediate absorption liquid form a dilute absorption liquid, a low temperature regenerator for further evaporating and separating the refrigerant by heating an intermediate absorption liquid generated and supplied by the high temperature regenerator with a refrigerant vapor generated by the high temperature regenerator, for obtaining the refrigerant vapor and a dense absorption liquid from the intermediate absorption liquid, a condenser supplied with a refrigerant liquid condensed by heating the intermediate absorption liquid by the low temperature regenerator and, at the same time, for obtaining the refrigerant liquid by cooling the refrigerant vapor generated and supplied by the low temperature regenerator, an evaporator wherein the refrigerant liquid supplied from the condenser is sprayed on a heat conductive pipe and the refrigerant evaporates by absorbing heat from a fluid flowing in the heat conductive pipe, an absorber for making a dilute absorption liquid by absorbing in the dense absorption liquid supplied by separating the refrigerant vapor, generated and supplied by the evaporator, from the low temperature regenerator, and for supplying the high temperature regenerator with the same, a low temperature heat exchanger where the dilute absorption liquid and the dense absorption liquid entering and exiting the absorber exchange heat each other, and a high temperature heat exchanger where the intermediate absorption liquid and the dilute absorption liquid entering and exiting the high temperature regenerator exchange heat each other, wherein a first exhaust gas heat collector where an exhaust gas exhausted from the burner and the dilute absorption liquid having passed through the high temperature heat exchanger exchange heat, a second exhaust gas heat collector where the exhaust gas having passed through the first exhaust gas heat collector and the dilute absorption liquid before entering the high temperature heat exchanger exchange heat, and a dilute absorption liquid branch pipe for bypassing a part of the dilute absorption liquid exiting the absorber from the low temperature heat exchanger for heat exchange with the refrigerant liquid exiting the low temperature regenerator and leading to the condenser, and letting flow into the second exhaust gas heat collector, are installed; and an absorption refrigerator of a second configuration, wherein a second dilute absorption liquid branch pipe for making the dilute absorption liquid bypass the second exhaust gas heat collector and letting flow into the high temperature heat exchanger, and a control means for controlling the quantity of the dilute absorption liquid flowing into the second dilute absorption liquid branch pipe by the temperature of the exhaust gas passed through the second exhaust gas heat collector, are installed in the absorption refrigerator of the first configuration of claim 1.

DETAILED DESCRIPTION OF THE PREFERRED EMBODIMENTS

Now the embodiments of the present invention will be described referring to an example of absorption refrigerator taking water as refrigerant, and lithium bromide (LiBr) aqueous solution as absorption liquid.

Figure 1:
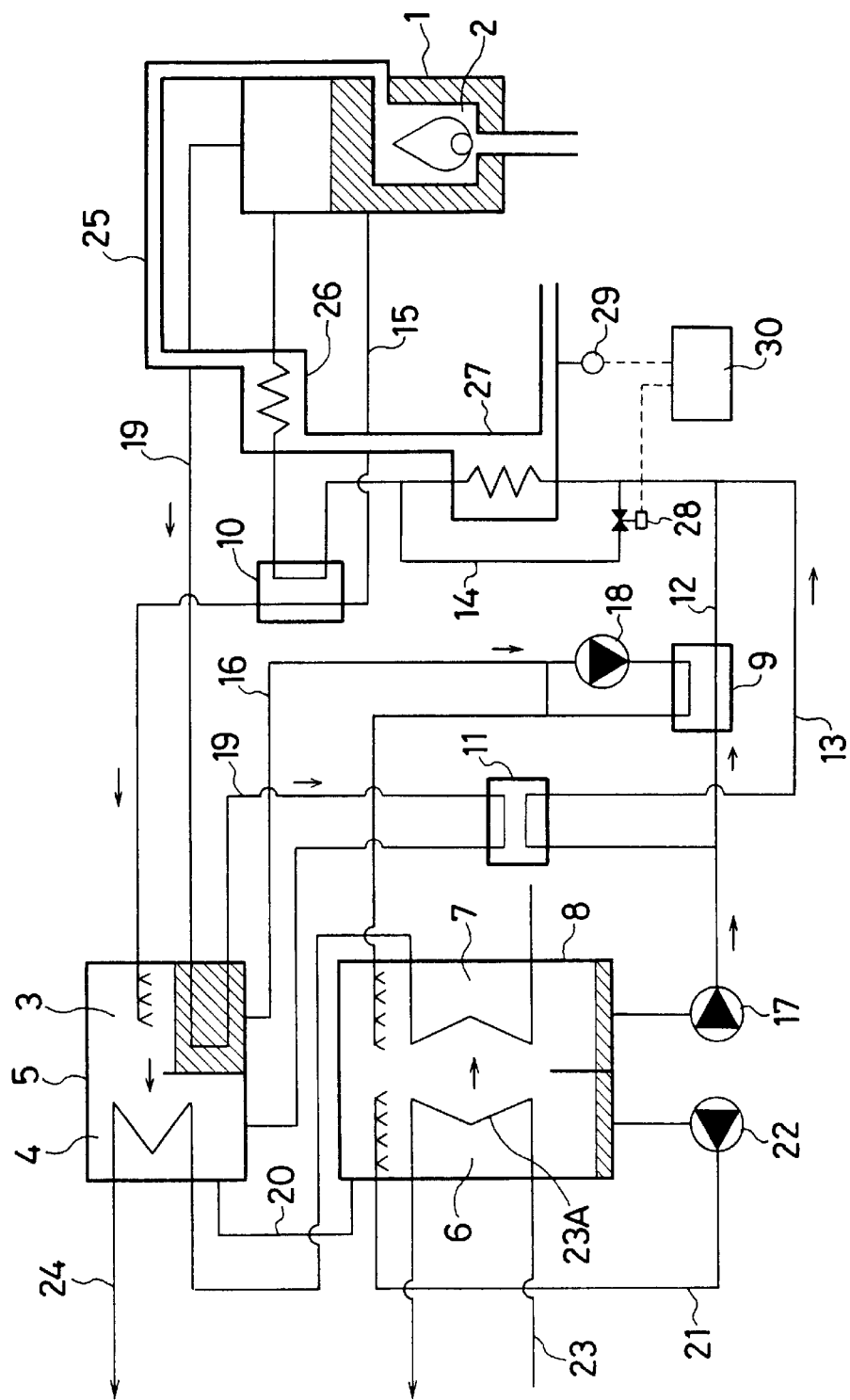
FIG. 1 illustrates a first embodiment of the present invention.
Figure 2:
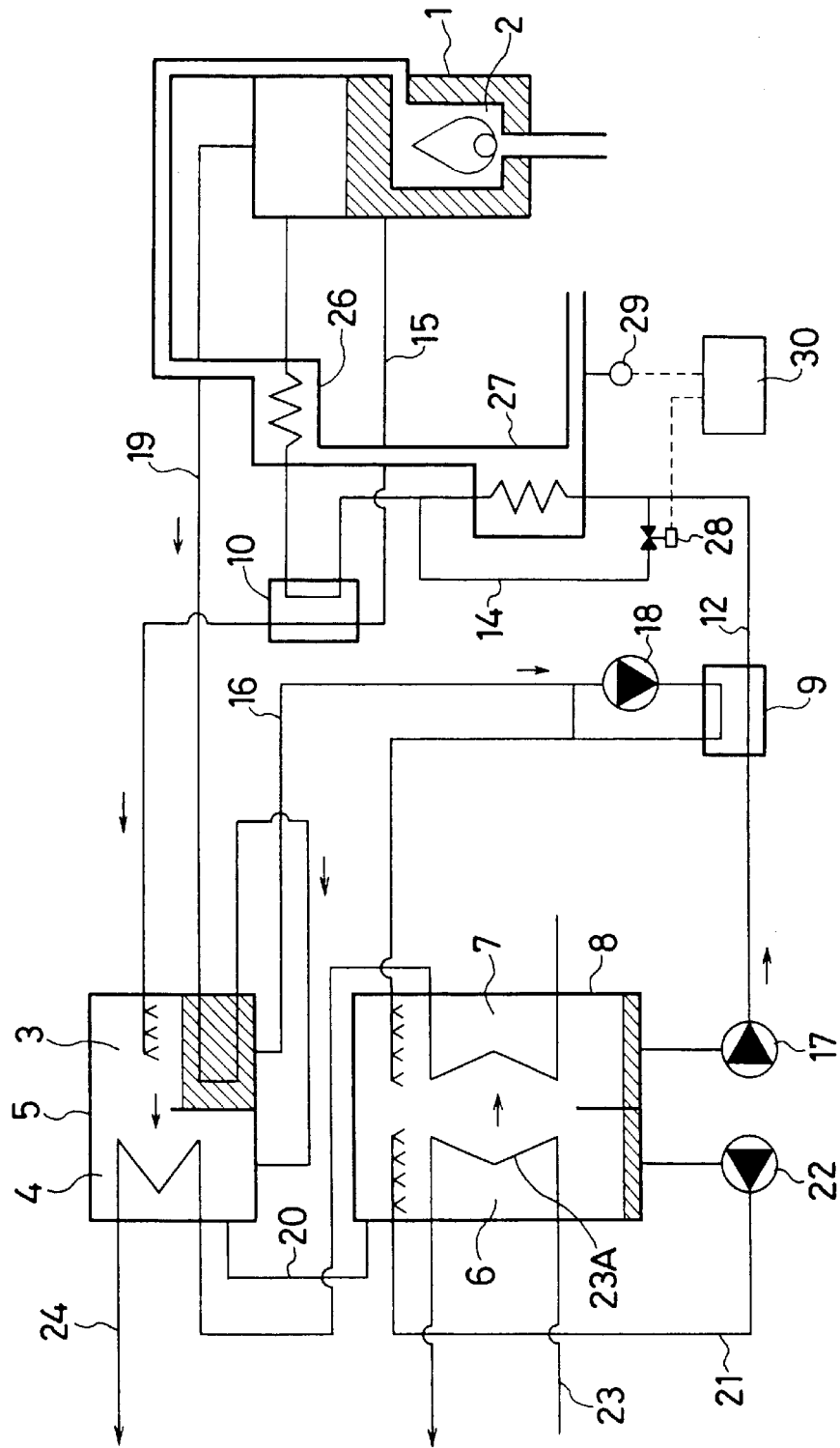
FIG. 2 illustrates a prior art.

An embodiment of the present invention will be described based on FIG. 1. In the drawing, 1 indicates a high temperature regenerator for evaporating and separating a refrigerant by heating an absorption liquid by the thermal power of a gas burner 2 using for instance town gas as fuel, 3 a low temperature regenerator, 4 a condenser, 5 a high temperature drum containing the low temperature regenerator and the condenser 4, 6 an evaportor, 7 an absorber, 8 a low temperature drum containing the evaporator 6 and the absorber 7, 9 a low temperature heat exchanger, 10 a high temperature heat exchanger, 11 a refrigerant drain heat collector, 12 to 16 absorption liquid pipes, 17 and 18 absorption liquid pumps, 19 to 21 refrigerant pipes, 22 a refrigerant pump, 23 a cold water pipe, 24 a cooling water pipe, 25 an exhaust pipe where exhaust gas discharged from the gas burner 2 passes, 26 a first exhaust gas heat collector, 27 a second exhaust gas heat collector, 28 a flow control valve installed on the absorption liquid pipe (second dilute absorption liquid branch pipe) 14, 29 a temperature sensor for detecting the temperature of the exhaust gas flowing in the downstream portion of the exhaust pipe 25, and 30 a controller for controlling the aperture of the flow control valve so that the temperature sensor 29 continues to detect a predetermined temperature, for example, 100° C.

In the absorption refrigerator of the aforementioned configuration, if the dilute absorption liquid is heated and boiled in the high temperature regenerator 1 by burning town gas by the gas burner 2, refrigerant vapor evaporated and separated from the dilute absorption liquid, and an intermediate absorption liquid of absorption liquid concentrated by separating the refrigerant vapor.

Hot refrigerant vapor generated by the high temperature regenerator 1 enters the low temperature regenerator 3 passing through the upstream portion of the refrigerant pipe 19, radiates heat and condense by heating the intermediate absorption liquid generated by the high temperature regenerator and entered into the low temperature regenerator 3 via the high temperature heat exchanger 10 by the absorption liquid pipe 15, and enters the condenser 4 passing through the downstream portion of the refrigerant pipe 19 where the refrigerant drain heat collector 11 is interposed.

Besides, refrigerant evaporated and separated from the intermediate absorption liquid by heating with the low temperature regenerator 3 enters the condenser 4, condenses and liquefies by exchanging heat with water running in the cooling water pipe 24, joins the refrigerant supplied by condensing from the refrigerant pipe 19, and enter the evaporator 6 passing through the refrigerant pipe 20.

Refrigerant liquid retained at the bottom of the evaporator 6 is sprayed by the refrigerant pump 22 interposed in the refrigerant pipe 21 on the heat conduction pipe 23A connected to the cold water pipe 23, evaporates by heat exchange with water supplied through the cold water pipe 23, and cools the water running in the heat conduction pipe 23A.

Refrigerant evaporated by the evaporator 6 enter the absorber 7, evaporates and separates the refrigerant by heating with the low temperature regenerator 3, absorption liquid of further concentrated absorption liquid, in short, is supplied by the absorption liquid pump 18 through the low temperature heat exchanger 9 by the absorption liquid pipe 16, and absorbed by the dense absorption liquid sprayed from above.

Then, absorption liquid diluted by absorbing the refrigerant in the absorber 7, in short, dilute absorption liquid is returned to the high temperature regenerator 1 by operating the absorption liquid pump 17.

When the absorption refrigerator is operated as mentioned above, as the cold water cooled by the heat of vaporization of the refrigerant in the heat conduction pipe 23A canalized inside the evaporator 6 can by circulated and supplied to a not shown air-conditioning load through the cold water pipe 23, a cooling operation such as air-conditioning can be performed.

In the absorption refrigerator of the aforementioned configuration, a part of dilute absorption liquid returned to the high temperature regenerator 1 from the absorber 7 by operating the absorption liquid pump 17 passes through the low temperature heat exchanger 9 interposed in the absorption liquid pipe 12 and the remaining passes through the refrigerant drain heat collector 11 interposed in the absorption liquid pipe (dilute absorption liquid branch pipe) 13, and are heated by respective heat exchangers.

Besides, the quantity of dilute absorption liquid heated by the exhaust gas discharged from the gas burner 2 passing through the second exhaust gas heat collector 27 is controlled by the flow control valve 28 interposed in the absorption liquid pipe 14, and total quantity of dilute absorption liquid returned to the high temperature regenerator from the absorber 7 flows in the high temperature heat exchanger 10 and the first exhaust gas heat collector 26 and is heated by respective one.

In other words, a part of dilute absorption liquid of about 40° C. discharged from the absorber 7 into the absorption liquid pipe 12 elevates the temperature to about 85° C. by heat exchange in the low temperature heat exchanger 9 with dense absorption liquid of about 90° C. discharged from the low temperature regenerator 3 into the absorption liquid pipe 16 and flowing to the absorber 7, and the remaining elevates the temperature to 70° C. by heat exchange in the refrigerant drain heat collector 11 with refrigerant of about 95° C. of the refrigerant pipe 19 condensed by the low temperature regenerator 3 and flowing to the condenser 4, and then they join together, and flow into a second exhaust gas heat collector 27 as, for instance, dilute absorption liquid of around 80° C.

Moreover, the flow of dilute absorption liquid flowing into the second exhaust gas heat collector 27 is controlled by adjusting the aperture of the flow control valve 28 interposed in the absorption liquid pipe 14 by the controller 30. For example, when the temperature. sensor 29 detects a temperature higher than the predetermined 100° C., the controller 30 reduces the aperture of the flow control valve 28 for supplying the second exhaust gas heat collector 27 with much dilute absorption liquid returning to the high temperature regenerator 1 from the absorber 7 and accelerating collection of heat retained by the exhaust gas, and when the temperature sensor 29 detects a temperature lower than the predetermined 100° C., increases the aperture of the flow control valve 28 for increasing the quantity of dilute absorption liquid flowing by bypassing the second exhaust gas heat collector 27, thus limiting the calorie collected from the exhaust gas, thereby the temperature of the exhaust gas exhausted through the exhaust pipe 25 is maintained at 100° C. higher than the dew point (the dew point of the combustion exhaust gas is 60° C. to 70° C. when town gas, namely, natural gas is used as fuel), and consequently, drain water is not generated by condensation of water vapor contained in the exhaust gas, and corrosion problem by the drain water will not occur, even at the starting or during the partial load operation, where the exhaust gas temperature is low.

Besides, the dilute absorption liquid heated passing through the second exhaust gas heat collector 27 and the dilute absorption liquid not heated by not passing through the second exhaust gas heat collector 27 join together to pass through the high temperature heat exchanger 10 and the first exhaust gas heat collector 26 and become dilute absorption liquid of the order of 135° C. by heat-exchanging with the intermediate absorption liquid flowing from the high temperature regenerator 1 to the low temperature regenerator 3 through the absorption liquid pipe 15 and exhaust gas of about 200° C. exhausted from the gas burner 2 and flow into the high temperature regenerator 1 therefore, the fuel consumption of the gas burner 2 can be economized.

In addition, since the refrigerant liquid condensing in the low temperature regenerator 3 and flowing into the condenser 4 passing through the downstream portion of the refrigerant pipe 19 exchanges heat with the dilute absorption liquid of about 40° C. in the refrigerant drain heat collector 11 as mentioned above and heats the same, and the refrigerant liquid itself is cooled down to about 45° C. (conventionally about 95° C.) and flows in, reducing the calorie radiating to the cooling water flowing in the interior of the cooling water pipe 24, the input calorie required for the high temperature regenerator 1 can be cut, and in this point also, the thermal efficiency of the absorption refrigerator can be improved remarkably.

It should be appreciated that the present invention is not limited to the aforementioned embodiment, but various modification can be realized without departing from the spirit prescribed in the attached claims.

For instance, by installing an exhaust pipe bypassing the second exhaust gas heat collector 27 in place of the absorption liquid pipe 14 where the flow control valve 28 interposes, and at the same time, a passage changeover valve, and by controlling so that the total quantity of exhaust gas flows into the second exhaust gas heat collector 27 when the temperature of the exhaust gas that has flown into the second exhaust gas heat collector 27 and exchanged heat with the dilute absorption liquid is higher than the predetermined 100° C., and the total quantity of exhaust gas bypasses the second exhaust gas heat collector 27 when said temperature is lower than the predetermined 100° C., the heat of the exhaust gas discharged from the gas burner 2 is collected during the normal operation with high exhaust temperature, and said heat collection is suspended at the starting or during the partial load operation, where the exhaust gas temperature is low, whereby, drain water is not generated by condensation of water vapor contained in the exhaust gas in the second exhaust gas heat collector 27, and corrosion problem by the drain water will not occur in the second exhaust gas heat collector 27.

Also, it can be configured to install a cheap on-off valve in place of the flow control valve 28, and to control the on-off thereof by the controller 30 so that the exhaust gas temperature detected by the temperature sensor 29 not be inferior to the predetermined temperature.

In addition, the absorption refrigerator may be the one reserved for the cooling operation such as air-conditioning as mentioned above, or the one allowing to perform the heating operation such as room heating by heating the dilute absorption liquid by the gas burner 2 without flowing the cooling water into the cooling water pipe 24 and supplying by circulation the load with water heated to the order of 55° C. for instance, by the heat conduction pipe 23A of the evaporator 6 through the cold water pipe (preferably referred to as hot water pipe if hot water circulates) 23, by connecting the piping so that the low temperature drum 8 can be directly supplied with refrigerant vapor heated and generated in the high temperature regenerator 1 and the dilute absorption liquid separated from the refrigerant vapor through evaporation.

Further, as fluid supplied to an air-conditioning load or others by cooling and so on by the evaporator 6, in addition to water and so on supplied without changing the phase as the aforementioned embodiment, freon or the like can be supplied changing the phase so as to allow a heat transfer using the latent heat.

As mentioned hereinabove, the present invention allows to collect effectively heat retained by the exhaust gas. Furthermore, since the refrigerant liquid condensing by heating the intermediate absorption liquid in the low temperature regenerator and flowing into the condenser exchanges heat with the dilute absorption liquid of low temperature (for instance 40° C.) in the refrigerant drain heat collector, flows into the high temperature regenerator increasing the temperature of the dilute absorption liquid and at the same time, and flows into the condenser by cooling down to about 45° C. (conventionally about 95° C.), the calorie radiating to the cooling water flowing in the condenser reduces, and these thermals operations also cut the input calorie required for the high temperature regenerator, and improve the thermal efficiency remarkably.

Further, as heat collection from the exhaust gas is limited for preventing an abnormal lowering of the exhaust gas temperature at the starting or during the partial load operation where the exhaust gas temperature is low, drain water is not generated by condensation of water vapor contained in the exhaust gas, and corrosion problem by the drain water will not occur.

What is claimed is:

1. An absorption refrigerator comprising:
   a high temperature regenerator for evaporating and separating a refrigerant by heating and boiling it with a burner, and for obtaining a refrigerant vapor and an intermediate absorption liquid from a dilute absorption liquid;
   a low temperature regenerator for further evaporating and separating the refrigerant by heating the intermediate absorption liquid generated and supplied by said high temperature regenerator with the refrigerant vapor generated by the high temperature regenerator, for obtaining the refrigerant vapor and a dense absorption liquid from the intermediate absorption liquid;
   a condenser supplied with a refrigerant liquid condensed by heating the intermediate absorption liquid by said low temperature regenerator and, at the same time, for obtaining the refrigerant liquid by cooling the refrigerant vapor generated and supplied by the low temperature regenerator;
   an evaporator in which the refrigerant liquid supplied from said condenser is sprayed on a heat conductive pipe and the refrigerant evaporates by absorbing heat from a fluid flowing in the heat conductive pipe;
   an absorber responsive to the refrigerant vapor generated and supplied by said evaporator for making a dilute absorption liquid by absorption into the dense absorption liquid supplied by separating the refrigerant vapor from the low temperature regenerator, and for supplying the high temperature regenerator therewith;
   a low temperature heat exchanger for providing heat exchange between the dilute absorption liquid and the dense absorption liquid entering and exiting said absorber exchange;
   and a high temperature heat exchanger for providing heat exchange between the intermediate absorption liquid and the dilute absorption liquid entering and exiting the high temperature regenerator, and wherein are provided:
   a first exhaust gas heat collector for providing heat exchanged between an exhaust gas exhausted from the burner and the dilute absorption liquid having passed through the high temperature heat exchanger;
   a second exhaust gas heat collector for providing heat exchange between the exhaust gas having passed through said first exhaust gas heat collector and the dilute absorption liquid before entering the high temperature heat exchanger after passing through the low temperature heat exchanger; and
   a dilute absorption liquid branch pipe for making a part of the dilute absorption liquid exiting the absorber bypass the low temperature heat exchanger, and flow into the second exhaust gas heat collector by heat-exchanging with the refrigerant liquid exiting the low temperature regenerator and leading to the condenser.

2. The absorption refrigerator of claim 1, wherein are provided:

a second dilute absorption liquid branch pipe for making the dilute absorption liquid bypass the second exhaust gas heat collector and letting flow into the high temperature heat exchanger, and a control means for controlling the quantity of the dilute absorption liquid flowing into said second dilute absorption liquid branch pipe by the temperature of the exhaust gas passed through the second exhaust gas heat collector.

* * * * *